(12) United States Patent
Kanayama (10) Patent No.: US 6,678,565 B2
(45) Date of Patent: Jan. 13, 2004

(54) CONTROL UNIT

(75) Inventor: Atsushi Kanayama, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 452 days.

(21) Appl. No.: 09/820,670

(22) Filed: Mar. 30, 2001

(65) Prior Publication Data

US 2001/0028403 A1 Oct. 11, 2001

(30) Foreign Application Priority Data

Mar. 31, 2000 (JP) ........................................ 2000-098179

(51) Int. Cl.⁷ ............................................... G05B 19/18
(52) U.S. Cl. ......................... 700/56; 700/302; 359/696
(58) Field of Search ............................. 700/57, 58, 56, 700/64, 66, 75, 77, 85, 302; 359/696, 697

(56) References Cited

U.S. PATENT DOCUMENTS

| | | | |
|---|---|---|---|
| 5,012,423 A | 4/1991 | Osder | 701/116 |
| 5,493,357 A | 2/1996 | Hara et al. | 396/85 |
| 6,466,378 B2 * | 10/2002 | Kaneko et al. | 359/697 |

FOREIGN PATENT DOCUMENTS

JP 8334673 12/1996

* cited by examiner

*Primary Examiner*—Ramesh Patel
*Assistant Examiner*—Edward F. Gain
(74) *Attorney, Agent, or Firm*—Birch, Stewart, Kolasch & Birch, LLP (57) ABSTRACT

The control unit sets up the center and an insensitive zone of a zoom seesaw switch provided in a drive unit of an ENG lens by an electrical processing. The control unit is capable of dispensing with a mechanical adjustment of the center and the insensitive zone of the zoom seesaw switch in assembling the product, and the assembly of the product is thus simplified. On turning on a center setting switch while the zoom seesaw switch is released from the operation, an operational position of the zoom seesaw switch at that time is accurately set as the center that brings the moving rapidity of the zoom lens to zero. On setting an insensitive zone size by an insensitive zone setup device, the moving rapidity of the zoom lens becomes zero whenever the operational position of the zoom seesaw switch is within the insensitive zone. Any of these settings is carried out by a processing of a CPU.

20 Claims, 4 Drawing Sheets

CONTROL UNIT

BACKGROUND OF THE INVENTION

1. Field of the Invention

The present invention relates to a control unit and in particular to a control unit for controlling the rapidity or the like of a lens to be controlled according to an operation of a control member.

2. Description of Related Art

A drive unit for rotating a zoom ring by means of a motor is attached at the side of a body tube of an ENG lens. The zoom control of the ENG lens is carried out according to user's operation of a zoom seesaw switch provided on the drive unit. The zoom seesaw switch is swiveled by the operation in both directions from a standard position. The zoom seesaw switch returns to the standard position when the zoom seesaw switch is released from the operation (i.e., when the zoom seesaw switch is in a non-operation state). A potentiometer for determining the operational angle of the zoom seesaw switch is provided on the zoom seesaw switch. The potentiometer outputs a control signal corresponding to the operational angle of the zoom seesaw switch to a CPU for controlling the motor. In accordance with a value of the control signal given from the potentiometer, the CPU controls the rotating direction and the rapidity of the motor to rotate the zoom ring so as to control the moving direction and rapidity of a zoom lens. For example, upon pushing the zoom seesaw switch in one direction with respect to the standard position, the zoom lens moves in the telescopic view direction at the rapidity corresponding to the operational angle, whereas the zoom lens moves in the wide view direction opposed to the telescopic view direction at the rapidity corresponding to the operational angle upon pushing the zoom seesaw switch in the other direction opposed to the above, and further the zoom lens stops when the zoom seesaw switch is released from the operation.

The standard position of the zoom seesaw switch is a position where a control signal of zero is outputted from the potentiometer, i.e. a position to stop the zoom lens. The standard position is premised to be a return position to which the zoom seesaw switch returns when the zoom seesaw switch is released from the operation. However, there is the possibility of undesirable situations that the zoom lens does not stop even when the zoom seesaw switch is released from the operation, since the zoom seesaw switch does not always return to the standard position accurately depending on its return precision and the control signal does not always become zero even when the zoom seesaw switch is released from the operation. Hence, an insensitive zone is conventionally provided in the zoom seesaw switch so that the control signal never fails to become zero when the zoom seesaw switch is released from the operation. Japanese Patent Application Laid-Open No. 8-334673 discloses that the insensitive zone is so constructed that no change in operational angle can be sensed within a predetermined range of the operational angles and the control signal outputted from the potentiometer is so set as to become zero while the operational angle of the zoom seesaw switch comes within the predetermined range of the operational angles, i.e., within the insensitive zone.

Ideally, portions of the insensitive zone are equally allotted to the positive direction (e.g. the telescopic view direction) and the negative direction (e.g. the wide view direction) with respect to the standard position in the provision of the insensitive zone at the zoom seesaw switch. Actually, such an equal allotment is, however, difficult for all products in view of assembling. Besides, even if portions of the insensitive zone are equally allotted to the positive direction and the negative direction with respect to the standard position, the return position of the zoom seesaw switch does not always coincide with the standard position on account of errors in return precision as described above. Accordingly, when the zoom seesaw switch starts the operation in the positive direction or in the negative direction from the standard position, the operated quantity till the start of the zoom lens movement may be different between the positive direction and the negative direction. It is thus difficult for the user to operate the conventional zoom seesaw switch.

SUMMARY OF THE INVENTION

The present invention is achieved in consideration of such circumstances and it is one object of the present invention to provide a control unit capable of properly accomplishing the correspondence between the operational position of the operational member and the corresponding control contents in spite of variance in assembling precision and achieving an improvement in the operability of the operational member, a simplified assembly and the saving of manufacturing cost by permitting the setting and adjustment of the standard position of the operational member and an insensitive zone of the zoom seesaw switch to be electrically accomplished.

To attain the above object, the present invention is directed to a control unit which controls a control target, the control unit comprising: an operational member which is set at an operational position by an operation; a standard position setting instruction receiving device which receives a setting instruction to set a standard position with respect to the operational member; a standard position determining device which determines, at a time when the standard position setting instruction receiving device receives the setting instruction, the operational position of the operational member at the time as the standard position; and a control device which controls the control target under control contents in accordance with the operational position of the operational member, wherein the control contents over the control target when the operational member is at the standard position coincide with predetermined standard control contents over the control target.

Preferably, the control unit further comprises: a position determining device which determines the operational position of the operational member and outputs a control signal corresponding to the determined operational position, wherein the standard position determining device determines, at the time when the standard position setting instruction receiving device receives the setting instruction, a value of the control signal outputted from the position determining device at the time as a value representing the standard position, wherein the control device adjusts the value of the control signal outputted from the position determining device so that the value representing the standard position coincides with a predetermined standard value, and the control device controls the control target under the control contents in accordance with the adjusted value of the control signal.

Preferably, the control unit further comprises: a standard position setting instruction outputting device which outputs the setting instruction to set the standard position with respect to the operational member, wherein the standard position setting instruction receiving device receives the setting instruction outputted from the standard position setting instruction outputting device.

Preferably, the operational member returns to a return position when the operational member is released from the operation; and the standard position is set to the return position.

Preferably, the control unit controls the control target to move the control target at a rapidity according to the operational position of the operational member; and the control contents over the control target when the operational member is at the standard position is control to bring the control target to a stop.

The control target may be a moving lens in a lens apparatus.

The present invention is also directed to a control unit which controls a control target, the control unit comprising: an operational member which is set at an operational position by an operation; an insensitive zone size determining device which determines, when an insensitive zone including a predetermined standard position with respect to the operational member is set, a size of the insensitive zone; and a control device which controls the control target under control contents in accordance with the operational position of the operational member, wherein the control contents over the control target coincide, whenever a difference between the operational position of the operational member and the predetermined standard position is not more than the size of the insensitive zone determined by the insensitive zone size determining device, with the control contents over the control target when the operational member is at the standard position.

The present invention is also directed to a control unit which controls a control target, the control unit comprising: an operational member which is set at an operational position by an operation; a standard position setting instruction receiving device which receives a setting instruction to set a standard position with respect to the operational member; a standard position determining device which determines, at a time when the standard position setting instruction receiving device receives the setting instruction, the operational position of the operational member at the time as the standard position; an insensitive zone size determining device which determines, when an insensitive zone including the standard position determined by the standard position determining device is set, a size of the insensitive zone; and a control device which controls the control target under control contents in accordance with the operational position of the operational member, wherein the control contents over the control target coincide, whenever a difference between the operational position of the operational member and the predetermined standard position is not more than the size of the insensitive zone determined by the insensitive zone size determining device, with predetermined standard control contents over the control target.

Preferably, the control unit further comprises: a position determining device which determines the operational position of the operational member and outputs a control signal corresponding to the determined operational position, wherein the control contents over the control target coincide, whenever a difference between a value of the control signal outputted from the position determining device and a value representing the standard position is not more than the size of the insensitive zone determined by the insensitive zone size determining device, with the control contents corresponding to the value representing the standard position.

Preferably, the control unit further comprises: an insensitive zone size setting device which sets the size of the insensitive zone, wherein the insensitive zone size determining device determines the size of the insensitive zone set by the insensitive zone size setting device as the size of the insensitive zone.

According to the present invention, making the setting and adjustment of the standard position of the operational member and the insensitive zone of the operational member performable by the electric processing enables the correspondence between the operational position of the operational member and the corresponding control contents to be accurately and easily carried out. Thereby, an improvement in the operability of the operational member in all products can be achieved without variance in characteristics with individual products. During the assembly of products, no high precision in the adjustment of the standard position of the operational member is required, the assembly of the operational member is simplified, and the reduction of a manufacturing cost is attainable.

Moreover, making the setting and adjustment of the insensitive zone of the operational member performable by the electric processing eliminates the need for providing a conventional mechanical insensitive zone and enables the assembly of the operational member to be simplified and the reduction of a manufacturing cost to be achieved. The electric provision of the insensitive zone enables the size of the insensitive zone to be freely set and modified and further when portions of the insensitive zone are provided in both directions with respect to the standard position of the operational member, its portions can be easily allotted to both directions equally, thereby enabling the operability to be improved.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Referring to the appended drawings, preferred embodiments of a control unit according to the present invention will be described below.

Figure 1:
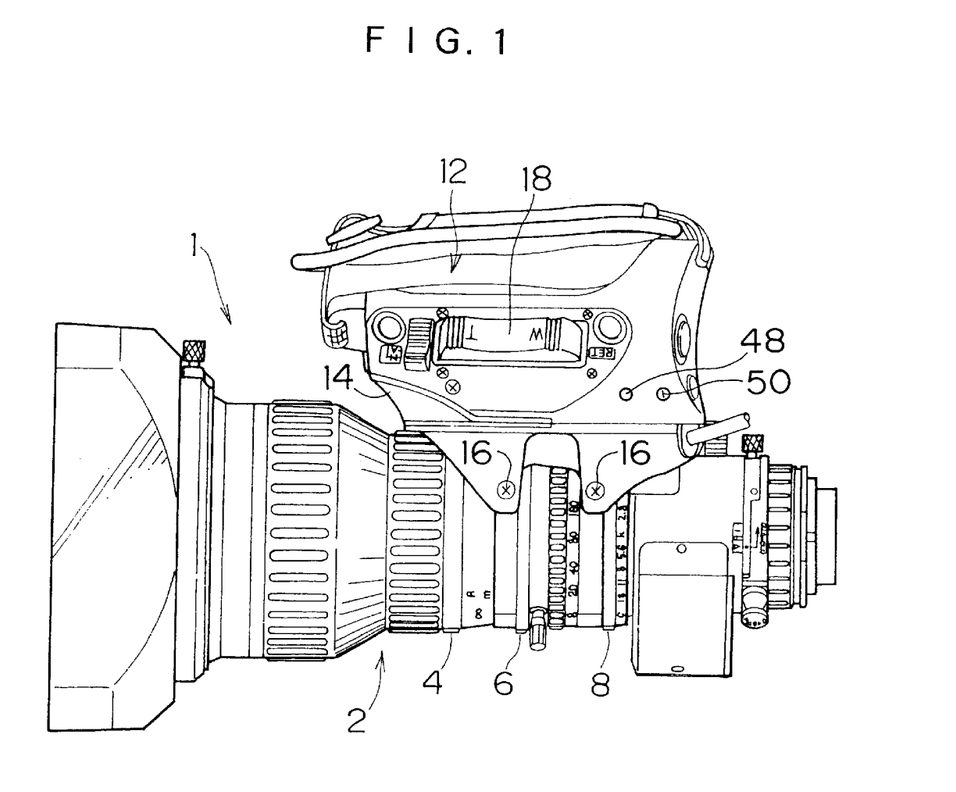
FIG. 1 is an external plan view of a lens apparatus in use for a television camera including a lens drive unit according to an embodiment of the present invention.

FIG. 1 is an external plan view showing one example of a lens apparatus in use for a television camera to which the present invention is applicable. The lens apparatus 1 shown in FIG. 1 is an inner focus type zoom lens used in a broadcasting television camera such as an ENG camera or the like. A lens body tube 2 is equipped with a focus ring 4, a zoom ring 6 and an iris ring 8. In the unillustrated interior of the lens body tube 2, as is well known, a fixed-focus lens, a moving-focus lens, a zoom lens, an iris and a relay lens are provided in sequence from the front. The focus adjustment can be carried out by moving the moving-focus lens along the optical axis upon rotating the focus ring 4. The zoom adjustment can be carried out by moving the zoom lens along the optical axis upon rotating the zoom ring 6. The iris adjustment can be carried out by changing the aperture diameter of the iris upon rotating the iris ring 8.

A drive unit 12 for driving the focus ring 4, the zoom ring 6 and the iris ring 8 is provided at the lateral part of the lens body tube 2. The drive unit 12 has a case 14, which is attached to the lateral part of the lens body tube 2 through screws 16. In the case 14, a focus driving motor, a zoom driving motor and an iris driving motor (not shown) are disposed. These motors are operatively connected to the focus ring 4, the zoom ring 6 and the iris ring 8 through gear transmission mechanisms (not shown), respectively. Thus, the rings 4, 6 and 8 are rotated by driving the motors, respectively.

An operational member for the zoom control referred to as a zoom seesaw switch 18 is provided on the upper surface of the case 14 of the drive unit 12. The zoom seesaw switch 18 is so constructed as to turn in both directions with respect to a return position by operations and return to the return position when the zoom seesaw switch is released from the operation (during the non-operation). Upon operating the zoom seesaw switch 18 to the telescopic view (T) side or to the wide view (W) side, the zoom ring 6 rotates to the telescopic view side or the wide view side by means of the zoom driving motor to move the zoom lens to the telescopic view side or the wide view side, while the zoom lens moves faster with increasing operational angle of the zoom seesaw switch 18.

A center setup switch 48 and an insensitive zone setup knob 50 are provided on the upper surface of the case 14 of the drive unit 12. Upon pressing the center setup switch 48, the center setup described later is carried out and an insensitive zone size described later can be adjusted by adjusting the rotational position of the insensitive zone setup knob 50.

Figure 2:
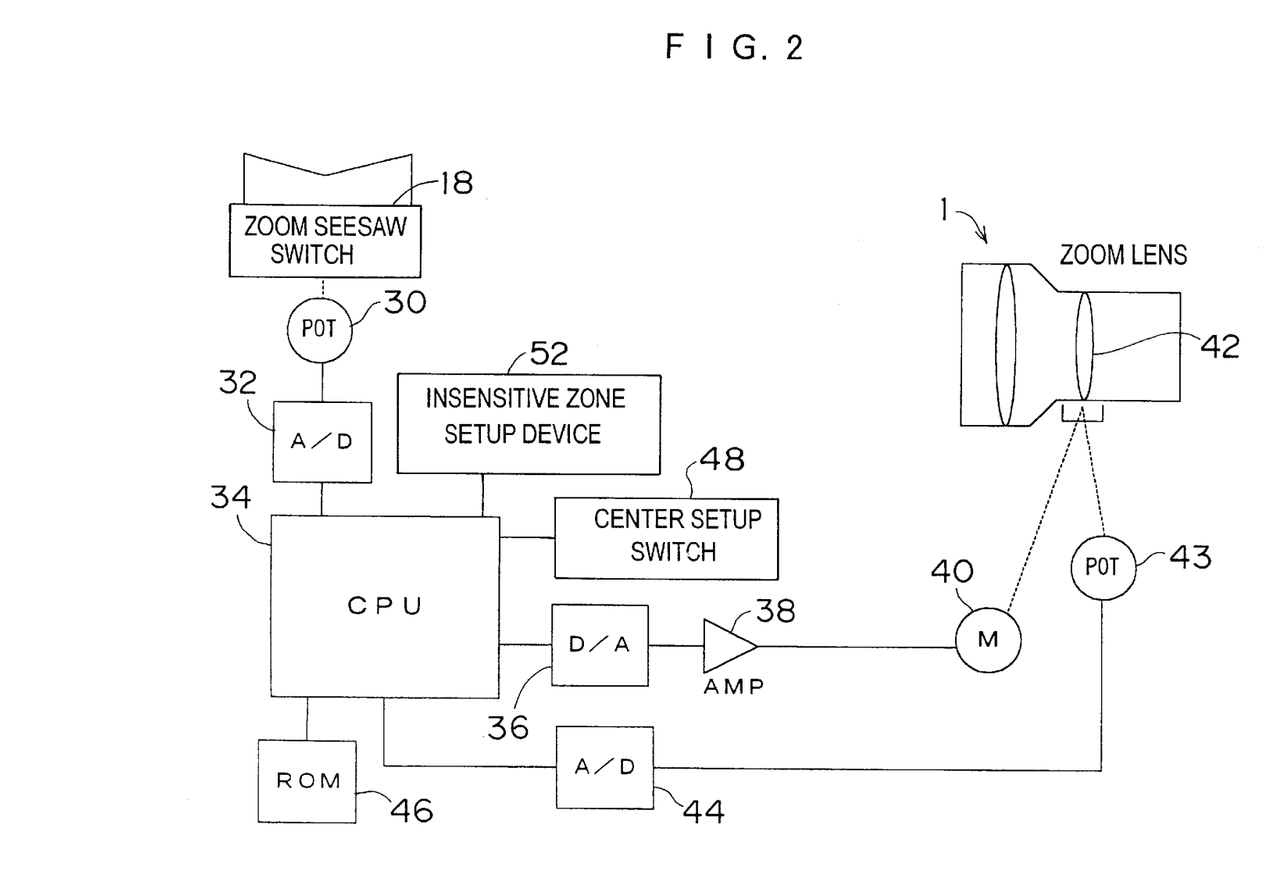
FIG. 2 is a block diagram of the lens drive unit in FIG. 1.

FIG. 2 is a block diagram of the configuration related to the zoom control in the lens apparatus 1, showing one embodiment of control unit according to the present invention. First, the basic zoom control operation will be described. As shown in FIG. 2, the operational angle of the zoom seesaw switch 18 is determined by means of a potentiometer 30, and a control signal of a voltage corresponding to the operational angle of the zoom seesaw switch 18 is outputted from the potentiometer 30. The control signal outputted from the potentiometer 30 is given to a CPU 34 through an A/D converter 32. Determining the operational angle of the zoom seesaw switch 18 may be performed not only by means of a potentiometer but by means of an encoder that outputs a pulse for each operation by a predetermined angle, a magnetic sensor using a magnetic resistance, or other such means.

The CPU 34 determines a value of driving signal for instructing the rotating direction and the rotating rapidity of the zooming motor 40 according to the value of the control signal given as described above, and outputs the driving signal to an amplifier 38 through a D/A converter 36. The amplifier 38 applies a voltage corresponding to the driving signal given by the CPU 34 to a motor 40 so as to control the motor 40 at the rotating direction and the rotating rapidity instructed by the driving signal. Thereby, in linkage with the rotation of the motor 40, the zoom lens 42 of the lens apparatus 1 moves along the optical axis. By these zoom control operations, the moving direction and the rapidity of the zoom lens 42 are controlled corresponding to the operational angle of the zoom seesaw switch 18.

The CPU 34 acquires the position of the zoom lens 42 from a potentiometer 43 through an A/D converter 44. The processing in the CPU 34 is carried out by a program recorded in a ROM 46.

Next, the center setup processing in the above-described CPU 34 will be described. The center setup processing is a processing for setting the center (standard position) of the zoom seesaw switch 18, i.e. for setting a position of the zoom seesaw switch 18 at which the drive of the motor 40 is stopped. The standard position of the zoom seesaw switch 18 is set to the operational angle of the zoom seesaw switch 18 formed when the above center setup switch 48 turns ON. If the center setup switch 48 turns ON in a state of operating the zoom seesaw switch 18, any operational angle can be set to the standard position, but as a general way of using, the above center setup switch 48 turns ON during the zoom seesaw switch 18 is released from the operation to set the return position to the standard position.

At the assembling stage of a product, the drive of the motor 40 is set to stop if a value of the control signal given from the potentiometer 30 is a given standard value (e.g., zero), and it is ideal that the zero value of control signal is outputted from the potentiometer 30 whenever the zoom seesaw switch 18 is at the return position. However, in actually assembled products, a dispersion for each product is present regarding the return position or the like of the zoom seesaw switch 18, and the zero value of control signal is not always outputted from the potentiometer 30 at the return position. Especially in this embodiment, it is premised that no conventional mechanical insensitive zone is provided in the zoom seesaw switch 18, so that the assembling operation can be simplified and the manufacturing cost can be reduced. Hence, it is difficult to mechanically adjust the potentiometer 30 and the zoom seesaw switch 18 so that the control signal of zero value is outputted whenever the zoom seesaw switch 18 is at the return position.

In this embodiment, the return position can become regarded as the center (i.e., the standard position) by turning on the center setup switch 48 when the zoom seesaw switch 18 is at the return position. If the return position is thus set to the standard position, a value of control signal outputted from the potentiometer 30 at that return position would be regarded as zero value for stopping the drive of the motor 40 without fail.

Figure 3:
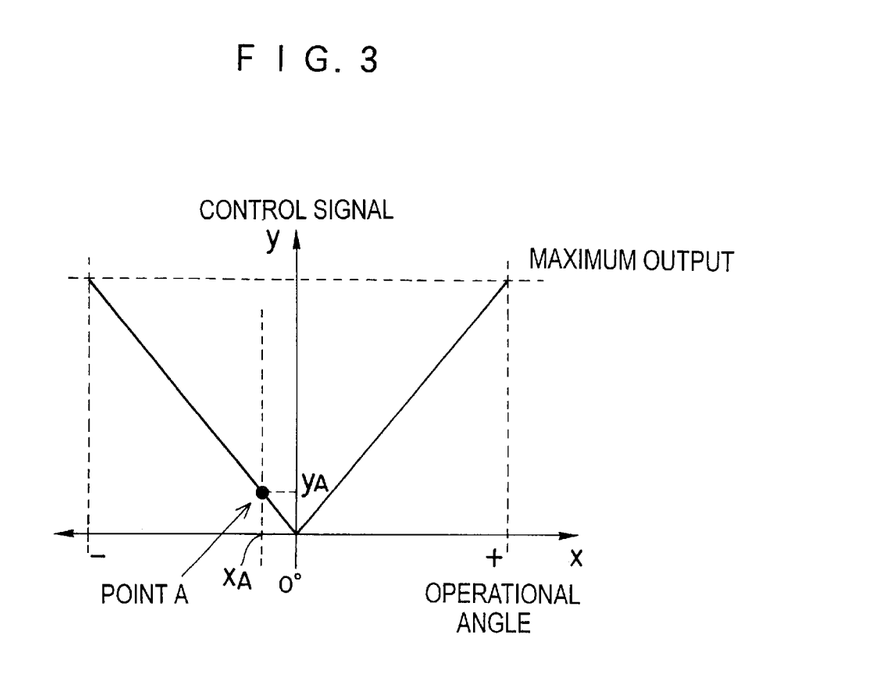
FIG. 3 is an illustration used for an explication of a center setting process of an operational member of the lens drive unit.

FIG. 3 is a graph showing a relation between operational angles of the zoom seesaw switch 18 and values of the control signal outputted from the potentiometer 32. The operational angle of the zoom seesaw switch 18 is so defined as 0° when the value of control signal is the standard value, i.e. zero, while the value of control signal increases in proportion to the operational angle in the positive (+) direction (the telescopic view direction) or in the negative (−) direction (the wide view direction) around the position of 0°. To simplify the description, the value of control signal is set to zero when the operational angle is 0°, but actually, the value of control signal may be not zero when the operational angle is 0°. In FIG. 3, the value of control signal is shown to increase with increasing the operational angle (an absolute value of the operational angle) in symmetry to 0° of operational angle, but actually, if the operational angle increases in the negative direction from 0°, the value of control signal also increases in the negative area from zero. Namely, the value of control signal is represented with the absolute value thereof in FIG. 3.

When the center setup switch 48 turns on in a state where the zoom seesaw switch 18 is at the return position, the CPU 34 acquires and stores the value of control signal at that time as the value to be regarded as the standard. Assuming that the return position of the zoom seesaw switch 18 is at the position of operational angle $x_A$ with respect to the initial standard position (a position at which the value of control signal becomes zero) as shown in FIG. 3, for example, the CPU 34 acquires and stores the value $y_A$ of control signal at the point A in FIG. 3 as the value that is regarded as the standard. In controlling the motor 40 in accordance with the value given from the potentiometer 30, the CPU 34 corrects the value of control signal given from the potentiometer 30 in accordance with the value stored as one regarded as the standard. Here, letting y and $y_A$ be the value of control signal given from the potentiometer 30 and the value stored as one regarded as the standard, respectively, the value y' corrected by the CPU 34 becomes $$y'=y-y_A.$$

Figure 4:
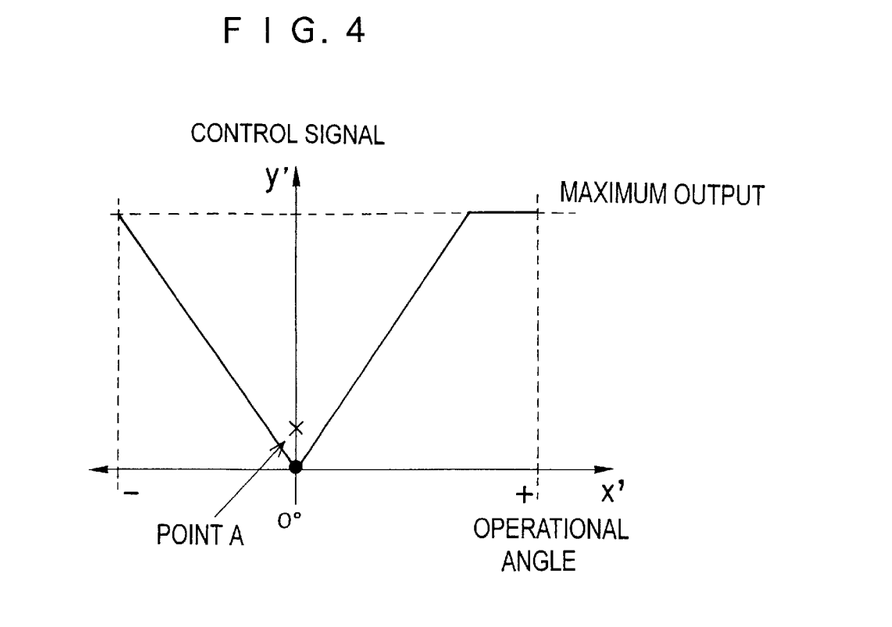
FIG. 4 is an illustration used for the explication of the center setting process.

Thereby, the value $y_A$ of control signal given from the potentiometer 30 when the zoom seesaw switch 18 is at the return position is corrected to the standard value. A relation between the value y' of control signal after the correction and the operational angle x' (=x−$x_A$) of the zoom seesaw switch 18 at the setting of its return position to 0° is expressed in FIG. 4. The corrected value y' of control signal increases in the positive direction (telescopic view direction) and in the negative direction (wide view direction) around the return position of the zoom seesaw switch 18 in proportion to the operational angle. Namely, like the relation between the operational angle and the value of control signal shown in FIG. 3, the return position of the zoom seesaw switch 18 becomes the standard position and the drive of the motor 40 ends in stopping at that position. If the corrected control signal becomes greater than a predetermined maximum output, the CPU 34 restricts this value to the value of the maximum output as shown in the positive area of the operational angle in FIG. 4.

As described above, when the value of control signal from the potentiometer 30 is corrected, the CPU 34 evaluates a value of driving signal for instructing the rotating direction and the rapidity of the motor 40 in accordance with the corrected value of control signal. Namely, on the assumption that a relation between the value y of control signal and a value z of driving signal is given beforehand in terms of the following function g:

$$z=g(y),$$

the CPU 34 evaluates the value z of driving signal by using the corrected value y' of control signal as $$z=g(y')$$

The CPU 34 outputs the value z of driving signal evaluated thus to the amplifier 38 through the D/A converter 36 as described above to control the motor 40 by means of this driving signal.

The center setup processing described above may be carried out prior to the shipping of the product to store the value ($y_A$) acquired for setting the standard in a memory such as the ROM 46 beforehand or may be performable any times freely by the user after the shipping and it may be made possible to store the value ($y_A$), acquired as one for setting the standard when the user turns on the center setup switch 48, into a memory such as the ROM 46. It is not always necessary to provide the center setup switch 48 at the apparatus itself and the center setup processing may be performed, for example, when an instruction signal of setting the standard position is given by a communication or the like from the outside. In the above description, a case of setting the return position of the zoom seesaw switch 18 as the standard position is described, but the present invention is not always limited to this and a desired operational angle may be set to the standard position by turning on the center setup switch 48 at a different operational angle from that of the return position of the zoom seesaw switch 18. Thereby, in the setting of an insensitive zone described later, portions of the insensitive zone in the positive direction and the negative direction with respect to the return position can be freely adjusted other than equally.

Next, the setup process of the insensitive zone in the CPU 34 will be described. As described above, the setup process of insensitive zone is a processing for providing an electric insensitive zone extending over the positive direction and the negative direction with respect to the center of the zoom seesaw switch 18 and allotting the positive and negative portions of the insensitive zone. Since no mechanical insensitive zone is provided at the zoom seesaw switch 18 and the insensitive zone is provided by the electric processing, simplifying the assembling is not only achieved as described above but the size of the insensitive zone can be also freely altered.

The size of the insensitive zone can be freely adjusted by the user or the like in reliance on the rotating position of the insensitive zone setting knob 50 shown in FIG. 1, but the size of the insensitive zone do not always need to be made adjustable by means of the insensitive zone setup knob 50. Through communication or the like, for example, the size of the insensitive zone may be acquired prior to the shipping or the like from outside the apparatus and to be stored in a memory such as the ROM 46 or a predetermined size of the insensitive zone may be stored in a memory such as the ROM 46. In FIG. 2, because of not being limited to the insensitive zone setup knob 50, means for giving the portions of the insensitive zone to the CPU 34 is specified to an insensitive zone setup device 52.

The CPU 34 acquires the size of an insensitive zone from the insensitive zone setup device 52 and sets the insensitive zone and its size in accordance with this. In the setup of the insensitive zone, correction considering the insensitive zone may be performed when correcting the value of control signal in the center setup processing as described above or else a factor of the insensitive zone may be incorporated into the above function g for evaluating the value of driving signal from the value of control signal and here, a description here will be made for the former case. Letting d be an insensitive zone size acquired from the insensitive zone setup device 52 in the dimension of the control signal and letting $y_A$ be the value set as one to be regarded as the standard in the center setup processing as described above, the CPU 34 evaluates the corrected value y' of control signal for the value of control signal given from the potentiometer 30 according to the following equations:

$$y'=0 \text{ (for } |y-y_A|\leq d),$$

$$y'=y-y_A-d \text{ (for } y-y_A>d), \text{ and}$$

$$y'=y-y_A+d \text{ (for } y-y_A<-d).$$

Figure 5:
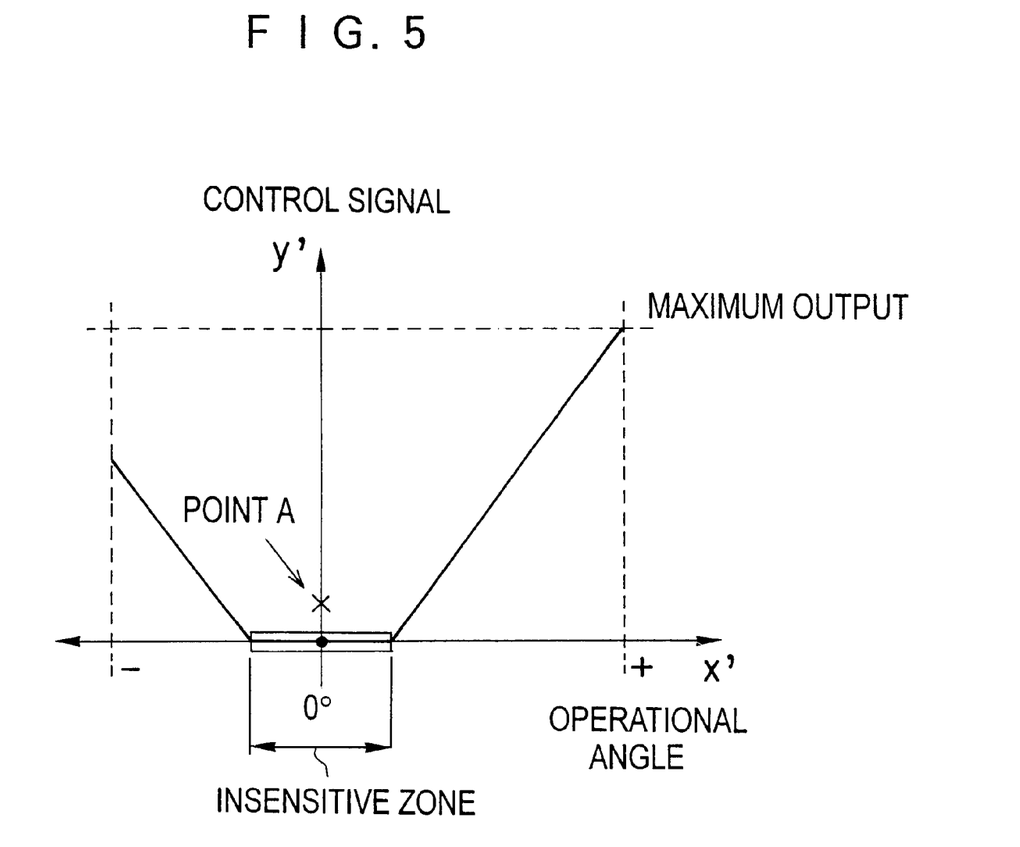
FIG. 5 is an illustration used for the explication of an insensitive zone setting process of the operational member of the lens drive unit.

FIG. 5 is a graph showing a relation between the value y' of control signal corrected thus and the operational angle x' of the zoom seesaw switch 18 with the return position of the zoom seesaw switch 18 set to 0°. As shown in FIG. 5, the insensitive zone is symmetrically formed in the positive direction and in the negative direction about 0°. On changing the insensitive zone size d by insensitive zone setup device 52, the width of the insensitive zone is changed freely. By setting the insensitive zone by the electric processing as described above, there is no need for providing a mechanical insensitive zone as conventionally, the assembly is simplified and the reduction of the manufacturing cost is achieved.

In the above embodiment, the case of the operational member comprising the zoom seesaw switch is described, but an applicable operational member of the present invention is not limited to a specified type and may be an operational member such as a thumb ring provided at a controller such as a zoom rate demand, for example.

In the above embodiment, an application of the present invention to the control of the zoom lens is described, but the present invention is not limited to the control of the zoom lens and is applicable also to a case of controlling any control target such as a focus lens or an aperture of a lens apparatus in accordance with the operation of a proper operational member. Moreover, the present invention is not limited to a lens apparatus, but is applicable to a case of controlling any control target in reliance on the operation of a proper operational member in any apparatus. When controlling the pan and tilt operation of a camera-loaded stand by means of a joystick of a remote controller, the present invention is applicable to the setting and adjustment of the standard position and the insensitive zone of the joystick.

In the above embodiment, the case of performing the control of lens or the like in reliance on the operation of an operational member that returns to a predetermined position when the operational member is released from the operation is described, but the present invention is applicable to the case of setting the standard position of an operational member by the electric processing or the case of desiring the provision of an electric insensitive zone on an operational member even for an operational member not returning to a predetermined position (such as a focus ring of a focus demand).

In the above embodiment, the operational position of bringing a control target to a stop is so arranged as to be established as the standard position of the operational member, but the present invention is not limited to this, and the operational position of implementing any predetermined control content can be set as the standard position of an operational member. For example, the standard position of an operational member may be an operational position to control the control target to move at the maximum speed, or may be an operational position to control the control target to move to a predetermined position.

In the above embodiment, the portions of the insensitive zone set by the insensitive zone setup device 52 are equally allotted to the positive direction and the negative direction with respect to the standard position of the operational member, but an insensitive zone comprising portions different by any size between the positive direction and the negative direction can be easily provided.

In the above embodiment, the case of making the setup and adjustment of both the standard position and the insensitive zone of the operational member performable is described, but the setup and adjustment of only either one of the standard position and the insensitive zone of the operational member may be made performable.

As described above, according to the present invention, making the setting and adjustment of a standard position of an operational member performable by the electric processing enables the correspondence between an operational position of the operational member and the corresponding control content to be accurately and easily carried out. Thereby, an improvement in the operability of the operational member in all products can be achieved without variance in characteristics with individual products. During the assembly of products, no high precision in the adjustment of the standard position of the operational member is required, and the assembly of the operational member is simplified and the reduction of the manufacturing cost is attainable.

Making the setup and adjustment of an insensitive zone of an operational member performable by the electric processing eliminates the need for providing a conventional mechanical insensitive zone and enables the assembly of the operational member to be simplified and the reduction of the manufacturing cost to be achieved. The electric provision of the insensitive zone enables the size of the insensitive zone to be freely set and modified and further when the insensitive zone is arranged over both directions with respect to the standard position of the operational member, its portions can be easily allotted to both directions equally, thereby enabling the operability to be improved.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A control unit which controls a control target, the control unit comprising:

an operational member which is set at an operational position by an operation;

a standard position setting instruction receiving device which receives a setting instruction to set a standard position with respect to the operational member;

a standard position determining device which determines, at a time when the standard position setting instruction receiving device receives the setting instruction, the operational position of the operational member at the time as the standard position; and a control device which controls the control target under control contents in accordance with the operational position of the operational member, wherein the control contents over the control target when the operational member is at the standard position coincide with predetermined standard control contents over the control target.

2. The control unit as set forth in claim 1, further comprising:

a position determining device which determines the operational position of the operational member and outputs a control signal corresponding to the determined operational position, wherein the standard position determining device determines, at the time when the standard position setting instruction receiving device receives the setting instruction, a value of the control signal outputted from the position determining device at the time as a value representing the standard position, wherein the control device adjusts the value of the control signal outputted from the position determining device so that the value representing the standard position coincides with a predetermined standard value, and the control device controls the control target under the control contents in accordance with the adjusted value of the control signal.

3. The control unit as set forth in claim 1, further comprising:
a standard position setting instruction outputting device which outputs the setting instruction to set the standard position with respect to the operational member,
wherein the standard position setting instruction receiving device receives the setting instruction outputted from the standard position setting instruction outputting device.

4. The control unit as set forth in claim 1, wherein:
the operational member returns to a return position when the operational member is released from the operation; and
the standard position is set to the return position.

5. The control unit as set forth in claim 1, wherein:
the control unit controls the control target to move the control target at a rapidity according to the operational position of the operational member; and
the control contents over the control target when the operational member is at the standard position is control to bring the control target to a stop.

6. The control unit as set forth in claim 1, wherein the control target is a moving lens in a lens apparatus.

7. A control unit which controls a control target, the control unit comprising:
an operational member which is set at an operational position by an operation;
an insensitive zone size determining device which determines, when an insensitive zone including a predetermined standard position with respect to the operational member is set, a size of the insensitive zone; and
a control device which controls the control target under control contents in accordance with the operational position of the operational member,
wherein the control contents over the control target coincide, whenever a difference between the operational position of the operational member and the predetermined standard position is not more than the size of the insensitive zone determined by the insensitive zone size determining device, with the control contents over the control target when the operational member is at the standard position.

8. The control unit as set forth in claim 7, further comprising:
a position determining device which determines the operational position of the operational member and outputs a control signal corresponding to the determined operational position,
wherein the control contents over the control target coincide, whenever a difference between a value of the control signal outputted from the position determining device and a value representing the standard position is not more than the size of the insensitive zone determined by the insensitive zone size determining device, with the control contents corresponding to the value representing the standard position.

9. The control unit as set forth in claim 7, further comprising:
an insensitive zone size setting device which sets the size of the insensitive zone,
wherein the insensitive zone size determining device determines the size of the insensitive zone set by the insensitive zone size setting device as the size of the insensitive zone.

10. The control unit as set forth in claim 7, wherein:
the operational member returns to a return position when the operational member is released from the operation; and
the standard position is set to the return position.

11. The control unit as set forth in claim 7, wherein:
the control unit controls the control target to move the control target at a rapidity according to the operational position of the operational member; and
the control contents over the control target when the operational member is at the standard position is control to bring the control target to a stop.

12. The control unit as set forth in claim 7, wherein the control target is a moving lens in a lens apparatus.

13. A control unit which controls a control target, the control unit comprising:
an operational member which is set at an operational position by an operation;
a standard position setting instruction receiving device which receives a setting instruction to set a standard position with respect to the operational member;
a standard position determining device which determines, at a time when the standard position setting instruction receiving device receives the setting instruction, the operational position of the operational member at the time as the standard position;
an insensitive zone size determining device which determines, when an insensitive zone including the standard position determined by the standard position determining device is set, a size of the insensitive zone; and
a control device which controls the control target under control contents in accordance with the operational position of the operational member,
wherein the control contents over the control target coincide, whenever a difference between the operational position of the operational member and the predetermined standard position is not more than the size of the insensitive zone determined by the insensitive zone size determining device, with predetermined standard control contents over the control target.

14. The control unit as set forth in claim 13, further comprising:
a position determining device which determines the operational position of the operational member and outputs a control signal corresponding to the determined operational position,
wherein the standard position determining device determines, at the time when the standard position setting instruction receiving device receives the setting instruction, a value of the control signal outputted from the position determining device at the time as a value representing the standard position,
wherein the control device adjusts the value of the control signal outputted from the position determining device so that the value representing the standard position coincides with a predetermined standard value, and the control device controls the control target under the control contents in accordance with the adjusted value of the control signal.

15. The control unit as set forth in claim 13, further comprising:
a position determining device which determines the operational position of the operational member and outputs a control signal corresponding to the determined operational position, wherein the control contents over the control target coincide, whenever a difference between a value of the control signal outputted from the position determining device and a value representing the standard position is not more than the size of the insensitive zone determined by the insensitive zone size determining device, with the control contents corresponding to the value representing the standard position.

16. The control unit as set forth in claim 13, further comprising:

a standard position setting instruction outputting device which outputs the setting instruction to set the standard position with respect to the operational member, wherein the standard position setting instruction receiving device receives the setting instruction outputted from the standard position setting instruction outputting device.

17. The control unit as set forth in claim 13, further comprising:

an insensitive zone size setting device which sets the size of the insensitive zone, wherein the insensitive zone size determining device determines the size of the insensitive zone set by the insensitive zone size setting device as the size of the insensitive zone.

18. The control unit as set forth in claim 13, wherein:

the operational member returns to a return position when the operational member is released from the operation; and the standard position is set to the return position.

19. The control unit as set forth in claim 13, wherein:

the control unit controls the control target to move the control target at a rapidity according to the operational position of the operational member; and the control contents over the control target when the operational member is at the standard position is control to bring the control target to a stop.

20. The control unit as set forth in claim 13, wherein the control target is a moving lens in a lens apparatus.

* * * * *